(12) United States Patent
Kashima et al.

(10) Patent No.: US 8,851,105 B2
(45) Date of Patent: Oct. 7, 2014

(54) MASS FLOW METER, MASS FLOW CONTROLLER, MASS FLOW METER SYSTEM AND MASS FLOW CONTROL SYSTEM CONTAINING THE MASS FLOW METER AND THE MASS FLOW CONTROLLER

(75) Inventors: Toshihiro Kashima, Kyoto (JP); Yutaka Yoneda, Kyoto (JP); Yasuhiro Isobe, Kyoto (JP)

(73) Assignee: Horiba Stec, Co., Ltd. (JP)

( * ) Notice: Subject to any disclaimer, the term of this patent is extended or adjusted under 35 U.S.C. 154(b) by 786 days.

(21) Appl. No.: 12/722,570

(22) Filed: Mar. 12, 2010

(65) Prior Publication Data

US 2010/0229965 A1    Sep. 16, 2010

(30) Foreign Application Priority Data

Mar. 12, 2009   (JP) ................................. 2009-060319

(51) Int. Cl.
| | | |
|---|---|---|
| G01F 5/00 | (2006.01) | |
| G05D 7/06 | (2006.01) | |
| G01F 1/684 | (2006.01) | |
| G01F 25/00 | (2006.01) | |

(52) U.S. Cl.
CPC ............ *G01F 1/6847* (2013.01); *G05D 7/0635* (2013.01); *G01F 25/0007* (2013.01); *G01F 5/00* (2013.01)
USPC .......................... 137/486; 137/487.5; 73/1.34

(58) Field of Classification Search
USPC .......... 137/486, 487, 487.5; 73/1.34; 700/282
See application file for complete search history.

(56) References Cited

U.S. PATENT DOCUMENTS

| | | | | |
|---|---|---|---|---|
| 5,062,446 A | * | 11/1991 | Anderson | 137/486 |
| 5,321,992 A | * | 6/1994 | Mudd et al. | 73/1.34 |
| 5,944,048 A | * | 8/1999 | Bump et al. | 137/486 |
| 6,622,096 B1 | | 9/2003 | Ouji | |
| 6,671,584 B2 | * | 12/2003 | Horiuchi et al. | 700/282 |
| 7,380,564 B2 | * | 6/2008 | Lull et al. | 137/486 |

FOREIGN PATENT DOCUMENTS

| | | |
|---|---|---|
| JP | 04-262408 A | 9/1992 |
| JP | 11-94604 A | 4/1999 |
| JP | 11-118569 A | 4/1999 |
| JP | 2000-065609 A | 3/2000 |
| WO | 0025096 A1 | 5/2000 |

OTHER PUBLICATIONS

Decision to grant a patent dated Jul. 30, 2013 issued in the Japanese Patent Application No. 2009-060319, no English Translation.

* cited by examiner

*Primary Examiner* — Eric Keasel
(74) *Attorney, Agent, or Firm* — Cantor Colburn LLP

(57) ABSTRACT

An object of this invention is to provide a superior mass flow meter or the like that can flexibly cope with a change of a sample fluid such as a gas kind without requiring a special troublesome labor and that can measure a flow rate with high accuracy. The mass flow meter comprises a sensor section that detects a flow rate of a sample fluid flowing in a flow channel, a setting section that sets a flow rate characteristic function that is intrinsic to each fluid to determine a flow rate based on a flow rate detected value output by the sensor section and an instrumental error correction parameter that is independent from the flow rate characteristic function and common to multiple sample fluids to correct an instrumental error of each mass flow meter, and a flow rate calculating section that calculates a flow rate measurement value of the sample fluid by applying the flow rate characteristic function and the instrumental error correction parameter to the flow rate detected value.

7 Claims, 5 Drawing Sheets

MASS FLOW METER, MASS FLOW CONTROLLER, MASS FLOW METER SYSTEM AND MASS FLOW CONTROL SYSTEM CONTAINING THE MASS FLOW METER AND THE MASS FLOW CONTROLLER

FIELD OF THE ART

This invention relates to a mass flow meter to control a flow rate of a fluid such as a gas or a liquid in a semiconductor manufacturing process, a mass flow controller containing the mass flow meter, a mass flow meter system and a mass flow controller system containing the mass flow meter and the mass flow controller (hereinafter also referred to as a mass flow meter or the like).

BACKGROUND ART

Recently, a case is increasing that multiple process chambers are loaded on a single semiconductor manufacturing equipment to conduct multiple processes so that a kind of a fluid such as a gas or a liquid to be used in a semiconductor manufacturing process is increasing drastically. This requires a number of mass flow meters or the like.

In this circumstance provided is the arrangement having one single mass flow meter that can cope with a change of a gas kind as being the sample fluid or a change of the full-scale flow rate (the maximum measurement flow rate or the maximum control flow rate) without dismounting the mass flow meter from the piping (refer to, for example, the patent document 1).

PRIOR ART DOCUMENT

Patent Document

Patent Document 1: Japan patent laid-open number 11-94604 (page 12)

DISCLOSURE OF THE INVENTION

Problems to be Solved by the Invention

However, the inventor's keen examination reveals the following. In order to make a coefficient, so-called a conversion factor which is to calculate the flow rate measurement value corresponding to the gas kind in case the gas kind is changed and which is to be multiplied by the function to calculate the flow rate measurement value, common to multiple mass flow meters so as to enable the measurement of the flow rate with high accuracy, the coefficient should be changed to a coefficient that is compensated by an instrumental error between the mass flow meter as being a reference mass flow meter that obtains the coefficient and an actually used mass flow meter.

Meanwhile, since it is considered that the instrumental error of the mass flow meter is related with a kind of a sample fluid such as a gas kind, a parameter that compensates the instrumental error is also considered to be obtained by actually flowing each sample fluid in each mass flow meter respectively.

However, the inventor's keen examination also reveals the following. More specifically, the instrumental error can be restrained from an aspect of hardware by standardizing each structure of the hardware as much as possible. Then if using the hardware whose instrumental error is restrained, it is possible to measure the flow rate with high accuracy by dealing the instrumental error as common to multiple sample fluids.

From the above knowledge, the present claimed invention is inspired by an idea that it might be possible to provide a superior mass flow meter that can preferably cope with a change of a sample fluid such as a gas kind without requiring a special troublesome labor. More specifically, an object of the present claimed invention is to provide a superior mass flow meter or the like that can both cope with a change of a sample fluid such as a gas kind flexibly and measure a flow rate with high accuracy.

Means to Solve the Problems

In order to solve these technical problems, a mass flow meter in accordance with this invention comprises a sensor section that detects a flow rate of a sample fluid flowing in a flow channel, a setting section that sets a flow rate characteristic function that is intrinsic to a designated sample fluid to determine a flow rate based on a flow rate detected value detected by the sensor section and an instrumental error correction parameter that is independent from the flow rate characteristic function and common to multiple sample fluids to correct an instrumental error of each mass flow meter, and a flow rate calculating section that calculates a flow rate measurement value of the sample fluid by applying the flow rate characteristic function and the instrumental error correction parameter to the flow rate detected value.

In accordance with this arrangement, since the instrumental error correction parameter is independent from the flow rate characteristic function and common to multiple sample fluids, even though the sample fluid to be measure by the mass flow meter is changed, it is possible to measure the flow rate of the changed sample fluid with high accuracy just by setting the flow rate characteristic function corresponding to the sample fluid to be measured.

More specifically, in accordance with this invention, it is possible to set the instrumental error correction parameter common to multiple sample fluids as far as the mass flow meter is identical. As a result, in case that the sample fluid to be measured by the mass flow meter is changed, it does not require obtaining the instrumental error correction parameter intrinsic to every sample fluid or every flow rate characteristic function by actually flowing each sample fluid to be changed and correcting the mass flow meter. In addition, it is possible to measure the flow rate of the changed sample fluid easily with high accuracy just by setting an instrumental error correction parameter that is common to the mass flow meters and that is obtained by correcting by the use of the sample fluid different from the sample fluid to be changed, and by reading out a multipurpose flow rate characteristic function that is made common by the substantially identical hardware structure such as the sensor section or the bypass from the database and setting the flow rate characteristic function.

In addition, if the flow rate characteristic function is expressed by a quintic equation, it is possible to further enlarge a full-scale range as being the maximum flow rate measurable by the mass flow meter with providing a preferable approximation over a broad range. As a result, even though a range measurable by the mass flow meter is varied as prescribed, it is possible to conduct the measurement of the flow rate with high accuracy in a diversified range.

In case that a previously determined reference fluid is flown at a full-scale flow rate, if the instrumental error correction parameter is a coefficient to eliminate an error between the flow rate calculated by setting the flow rate characteristic function intrinsic to the reference fluid and the flow rate measurement value at a time when the full scale flow rate is measured by the mass flow meter to be the reference, the instrumental error correction parameter can be obtained just by measuring the full-scale flow rate only at one point by the use of the highly convenient reference fluid such as the inert gas, thereby diminishing a troublesome operation of correcting the mass flow meter or the like. Here, the full-scale flow rate is preferably the maximum flow rate measurable in a range of a predetermined error by the flow rate characteristic function, and may be a flow rate (a flow rate smaller than the maximum measurable flow rate) in case that the maximum measurable flow rate is limited to a predetermined value.

If the instrumental error correction parameter is a coefficient that is obtained by actually measuring nitrogen gas as the reference fluid and the coefficient is common to other different multiple sample gases, it is possible to avoid correcting the mass flow meter individually by the use of the sample fluid such as a toxic or corrosive gas or liquid so that the coefficient as being the instrumental error correction parameter can be obtained both safely and easily.

Furthermore, if a mass flow controller comprises the above-mentioned mass flow meter, a control valve arranged in the flow channel, and a controlling section that performs a comparison operation on the flow rate measurement value and a flow rate setting value and that controls the control valve based on a result of the comparison operation, it is possible to provide the highly versatile mass flow controller that can control the fluid with high accuracy and that can change the sample fluid as being an object to be controlled easily in accordance with a change in a semiconductor deposition process.

If a mass flow meter system or a mass flow controller system comprises multiple mass flow meters or multiple mass flow controllers and a command device that is to communicate with the mass flow meters or the mass flow controllers and that has a memory section to store the flow rate characteristic function related to each sample fluid and a sample fluid receiving section to receive designation of the sample fluid flowing in the flow channel, wherein the setting section searches the memory section for the flow rate characteristic function intrinsic to the sample fluid designated by the receiving section and sets the flow rate characteristic function, it is possible both to improve versatility of each mass flow meter and to simplify administration of the flow rate characteristic function such as adding or changing the flow rate characteristic function by intensively administrating the flow rate characteristic function with the following arrangement: a semiconductor manufacturing equipment or a high level computer to which multiple mass flow meters are connected is arranged and highly versatile flow rate characteristic function that is common to the mass flow meter whose hardware is substantially identical and that is stored in relation to each sample fluid is transmitted to each mass flow meter in accordance with the designated sample fluid through the electric communication circuit.

Effect of the Invention

In accordance with this invention, it is possible to provide a superior mass flow meter or the like that can flexibly cope with a change of a sample fluid such as a gas kind and that can measure a flow rate with high accuracy.

BEST MODES OF EMBODYING THE INVENTION

One embodiment of this invention will be explained with reference to drawings.

Figure 1:
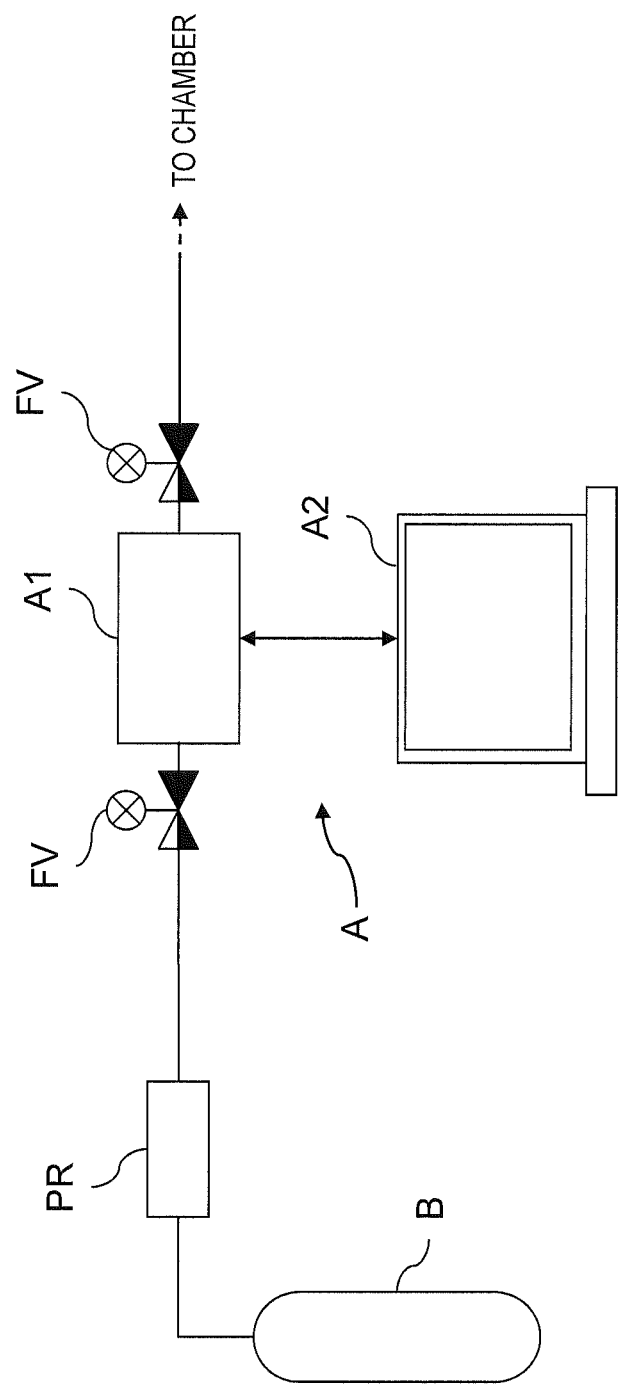
FIG. 1 is an overall general view showing a mass flow controller system in accordance with one embodiment of this invention.

A mass flow controller system A of this embodiment comprises a mass flow controller A1, a separately arranged command device A2 that controls/administrates the mass flow controller A1, and is used, as shown in, for example, FIG. 1, for a gas supply system to a chamber in a semiconductor manufacturing equipment. Hereinafter, each device will be explained.

Figure 2:
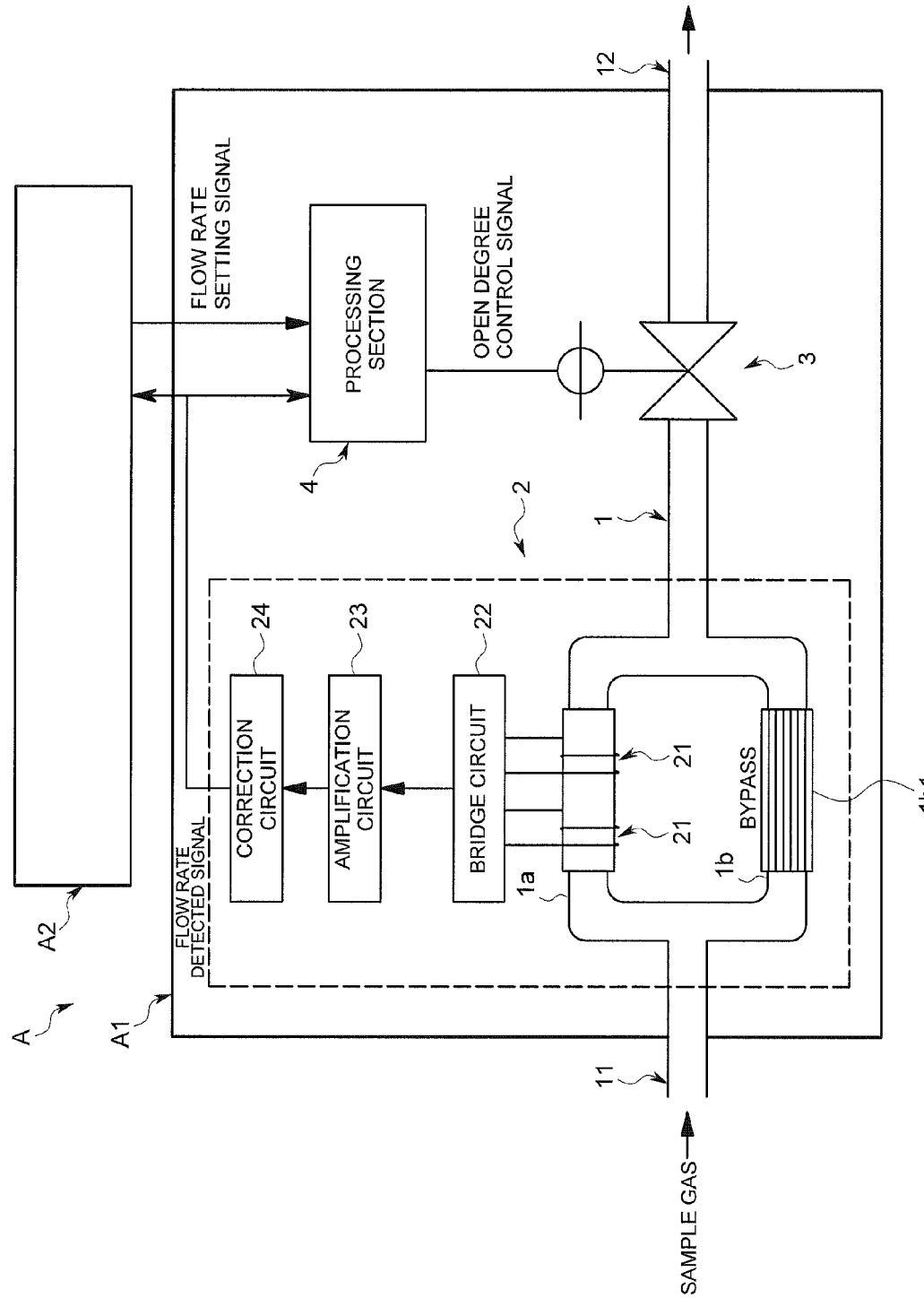
FIG. 2 is a pattern diagram showing an equipment configuration of a mass flow controller in this embodiment.

The mass flow controller A1, a pattern view of which is shown in FIG. 2, comprises a gas flow channel 1 (one example of "a flow channel" in this invention), a flow rate sensor section 2 (one example of "a sensor section" in this invention) to detect a flow rate of a sample gas G (one example of "a sample fluid" in this invention) flowing in the gas flow channel 1, a flow rate control valve 3 (one example of "a control valve" in this invention) arranged in, for example, a downstream side of the flow rate sensor section 2, and a processing section 4 having a controlling section 4a (refer to FIG. 3) that performs a comparison operation on a flow rate setting value based on a flow rate setting signal and a flow rate detected value as being a value of a flow rate detected signal output by the flow rate sensor section 2 and that controls the flow rate control valve 3 based on a result of the comparison operation. Each component will be explained concretely. Since the mass flow controller is the mass flow meter to which the controlling mechanism is further added, explanation on the mass flow controller will include an explanation on the mass flow meter and an explanation on the mass flow meter alone will be omitted.

As shown in FIG. 2, an upstream end of the gas flow channel 1 opens as an introduction port 11 and a downstream end of the gas flow channel 1 opens as a derivation port 12 respectively. As shown in FIG. 1, an air valve FV, a pressure regulator PR and a gas cylinder B are connected to the introduction port 11 through external piping, and a chamber (not shown in drawings) for manufacturing semiconductors is connected to the derivation port 12 through external piping. In this embodiment, as shown in FIG. 2, the gas flow channel 1 is so arranged to have gas branch flow channels 1a and 1b bifurcated and confluent between the introduction port 11 and the derivation port 12. A thermosensitive sensor 21, to be described later, is mounted on the gas branch flow channel 1a, and the gas branch flow channel 1b is utilized as a bypass where a laminar element 1b1 is arranged.

The flow rate sensor section 2, a detail of which is not drawn, comprises, for example, a pair of thermosensitive sensors (thermal sensors) 21 arranged in the gas flow channel 1. The flow rate sensor section 2 detects an instant flow rate of the sample gas G as an electric signal by means of the thermosensitive sensor 21, amplifies the electric signal by means of an internal electric circuit (a bridge circuit 22, an amplification circuit 23, and a correction circuit 24) and then outputs the flow rate detected signal (hereinafter also referred to as a sensor output) according to the detected flow rate.

The flow rate control valve 3, a detail of which is not drawn, is so arranged to change its valve open degree by means of an actuator comprising, for example, a piezoelectric element. The flow rate control valve 3 controls the flow rate of the sample gas G by driving the actuator with an open degree control signal as being an electric signal given from outside and by adjusting the valve open degree in accordance with a value of the open degree control signal.

The processing section 4 consists of a CPU, a memory, a digital or an analog electric circuit having an A/D converter or a D/A converter, and a communication interface to communicate with the command device A2, and may be dedicated or may utilize a general purpose computer such as a personal computer for a part or all. The processing section 4 may consists of an analog circuit alone to produce functions as each component without a CPU, or may not be integrally formed, or may consists of multiple components each of which is connected through a wire and/or wirelessly. In addition, the hardware may share with the command device 2.

Figure 3:
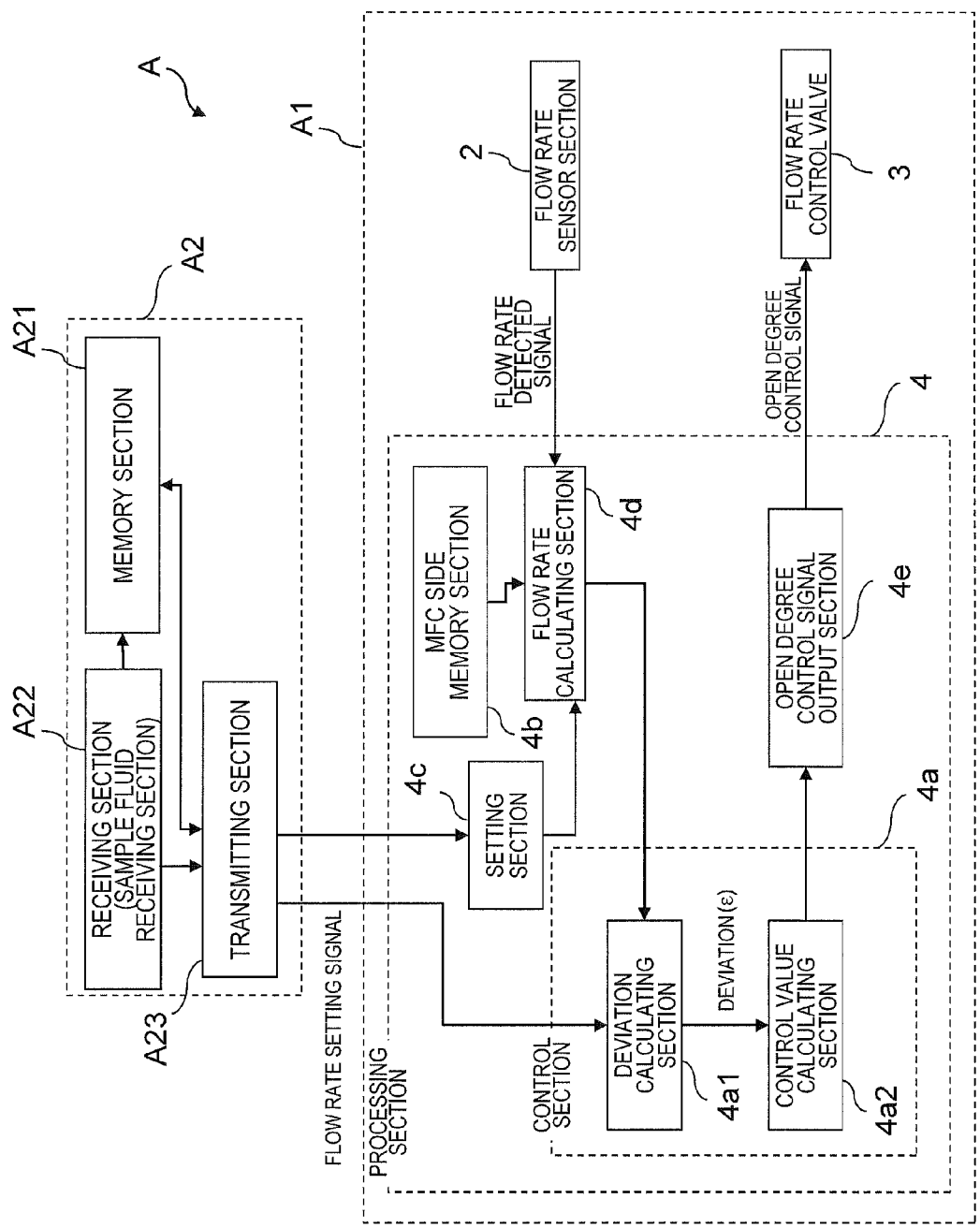
FIG. 3 is a functional configuration diagram of the mass flow controller system in this embodiment.

As shown in FIG. 3, the processing section 4 at least produces functions as the controlling section 4*a*, an MFC side memory section 4*b*, a setting section 4*c*, a flow rate calculating section 4*d* and an open degree control signal output section 4*e* by storing predetermined programs in the memory and cooperatively operating the CPU and its peripheral devices according to the program.

The setting section 4*c* consists of the CPU and the communication interface. The setting section 4*c* receives a flow rate characteristic function K (containing each coefficient ($a_{gas}$-$f_{gas}$) of a flow rate characteristic determining function (flow rate characteristic curve) and a full-scale flow rate ($FS_{gas}$) of a sample fluid determined corresponding to the flow rate characteristic determining function) determined for each sample fluid transmitted from the command device A2 and stores the flow rate characteristic function K in the MFC side memory section 4*b* set in the predetermined area of the memory. In addition, the setting section 4*c* reads out an instrumental error correction parameter α (a detail will be described later) stored in the memory section 4*b* and reads out the flow rate characteristic function K from the memory section 4*b* in accordance with a sample fluid to be measured (whose flow rate is to be controlled) on which a command is received by the command device A2. Then the setting section 4*c* sets a flow rate calculating expression used in the flow rate calculating section 4*d*. More specifically, in case that the flow rate calculating expression (the following expression (P1)) to calculate a flow rate of a reference gas N$_2$ as being a reference fluid is already set, the setting section 4*c* changes only a part of the flow rate characteristic function K according to the sample fluid (sample gas G) designated as an object to be measured and produces a flow rate calculating expression (the following expression (P2)) to calculate the flow rate of the sample gas G.

$$\text{Flow} = f_{N2}(x) \times FS_{N2} \times \alpha \quad (P1)$$

Where, $f_{N2}(x)$ is $a_{N2} \times x^5 + b_{N2} \times x^4 + c_{N2} \times x^3 + d_{N2} \times x^2 + e_{N2} \times x + f_{N2}$, $a_{N2}$ is a coefficient of a quintic term of the flow rate characteristic curve of N$_2$, $b_{N2}$ is a coefficient of a quartic term of the flow rate characteristic curve of N$_2$, $c_{N2}$ is a coefficient of a cubic term of the flow rate characteristic curve of N$_2$, $d_{N2}$ is a coefficient of a quadratic term of the flow rate characteristic curve of N$_2$, $e_{N2}$ is a coefficient of a degree one term of the flow rate characteristic curve of N$_2$, $f_{N2}$ is a coefficient of a degree zero term of the flow rate characteristic curve of N$_2$, $FS_{N2}$ is FS of N$_2$ (a full-scale flow rate in a flow rate characteristic curve of the reference gas N$_2$), α is a coefficient (a coefficient common for multiple sample gases) as being an instrumental error correction parameter, and x is a sensor output.

$$\text{Flow} = f_{gas}(x) \times FS_{gas} \alpha \quad (P2)$$

Where, $f_{gas}(x)$ is $a_{gas} \times x^5 + b_{gas} \times x^4 + c_{gas} \times x^3 + d_{gas} \times x^2 + e_{gas} \times x + f_{gas}$, $a_{gas}$ is a coefficient of a quintic term of the flow rate characteristic curve GC of the sample gas G, $b_{gas}$ is a coefficient of a quartic term of the flow rate characteristic curve GC of the sample gas G, $c_{gas}$ is a coefficient of a cubic term of the flow rate characteristic curve GC of the sample gas G, $d_{gas}$ is a coefficient of a quadratic term of the flow rate characteristic curve GC of the sample gas G, $e_{gas}$ is a coefficient of a degree one term of the flow rate characteristic curve GC of the sample gas G, $f_{gas}$ is a coefficient of a degree zero term of the flow rate characteristic curve GC of the sample gas G, $FS_{gas}$ is FS of the sample gas G (a full-scale flow rate in a flow rate characteristic curve of the sample gas G), α is a coefficient as being an instrumental error correction parameter, and x is a sensor output.

As will be mentioned later, the MFS side memory section 4*b* stores the instrumental error correction coefficient α that is set, for example, prior to factory shipment and is formed in the predetermined area of the memory. In addition, it is also possible for the MFS side memory section 4*b* to additionally store the flow rate characteristic functions K of the various sample gases G appropriately received by the setting section 4*c*.

The flow rate calculating section 4*d* receives the flow rate detected signal (the sensor output) and the flow rate calculating expression (P2) produced in the setting section 4*c*. Then the flow rate calculating section 4*d* calculates a flow rate of the sample gas G flowing in the gas flow channel 1 based on the flow rate detected value as being the value of the flow rate detected signal and the flow rate calculating expression (P2). The flow rate calculating section 4*d* transmits a flow rate measurement value as being the calculated flow rate to the controlling section 4*a* and a display device 105 (refer to FIG. 4) of the command device A2 or a display section (omit to show in drawings) arranged in the mass flow controller A1.

The controlling section 4*a* comprises a deviation calculating section 4*a*1 that obtains the flow rate measurement value received from the flow rate calculating section 4*d* and a flow rate setting value shown by the flow rate setting signal and that calculates a deviation ε between the flow rate measurement value and the flow rate setting value, and a control value calculating section 4*a*2 that calculates a feedback control value to the flow rate control valve 3 by providing at least a proportional calculation (preferably a HD calculation) on the deviation ε.

The open degree control signal output section 4*e* produces an open degree control signal having a value based on the feedback control value and outputs the open degree control signal to the flow rate control valve 3.

Figure 4:
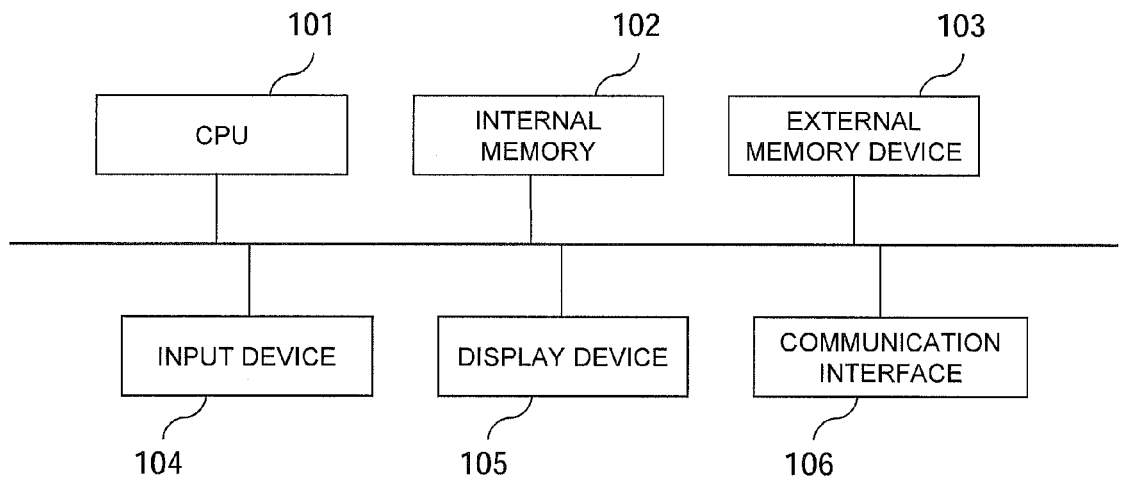
FIG. 4 is an equipment configuration diagram of a command device in this embodiment.

The command device A2 has an ordinary information processing function such as a personal computer and is arranged in, for example, a semiconductor manufacturing equipment, and as shown in FIG. 4, comprises a CPU 101, an internal memory 102, an external memory device 103 such as an HDD, an input device 104 such as a mouse and a keyboard, a display device 105 such as a liquid crystal display and a communication interface 106 to communicate with the mass flow controller A1. As shown in FIG. 3, the command device A2 produces functions as at least a memory section A21 (an example of the flow rate characteristic function memory section), a receiving section A22 (an example of the flow rate characteristic function receiving section), and a transmitting section A23 by cooperatively operating the CPU 101 and its peripheral devices according to the programs stored in, for example, the internal memory 102. In FIG. 3, the command device A2 corresponds one-to-one with the mass flow controller A1, however, multiple mass flow controllers A1 may be arranged to correspond with one command device A2 in an interactively communicable manner through a transmitting section A23 containing the communication interface 106.

The memory section A21 makes a database of multiple flow rate characteristic functions K specified for each type of the sample fluid and stores the database, and is formed in a predetermined area of, for example, the internal memory 102 or the external memory device 103. It is also possible that the memory section A21 of the command device A2 stores one flow rate characteristic function K and a host computer (not shown in drawings) that is communicable with the memory section A21 is arranged so as to make a database storing multiple flow rate characteristic functions K.

In case that the fluid to be measured is newly designated or the flow rate setting value or the type of the sample fluid to be measured is newly added through the input device 104, the receiving section A22 receives the flow rate characteristic function K intrinsic to the sample fluid to be measured. And then the receiving section A22 stores these parameters in the memory section A21.

The transmitting section A23 reads out various parameters such as the flow rate characteristic function K received by the receiving section A22 and stored in the memory section A21, and then transmits the parameters to the mass flow controller A1 at a predetermined timing. The transmitting section A23 contains the communication interface 106.

Figure 5:
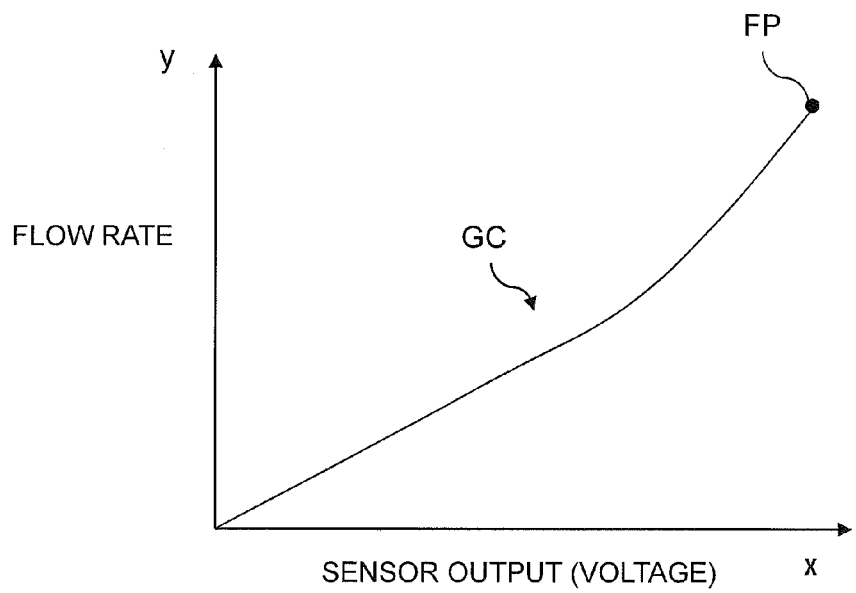
FIG. 5 is a view to explain a sensor output range in this embodiment.

The flow rate characteristic function K will be supplementally explained with reference to FIG. 5. The flow rate characteristic function K contains the flow rate characteristic determining function GC (the flow rate characteristic curve) having the above-mentioned each coefficient ($a_{gas}$-$f_{gas}$) and a full-scale flow rate FP ($FS_{gas}$) of the sample fluid determined corresponding to the flow rate characteristic determining function GC. The flow rate characteristic curve is equivalent to an approximate expression that shows a relationship between the sensor output and the flow rate and that is obtained by actually flowing a real fluid such as a real gas (a fluid to be an object to be measured) in one or multiple mass flow meter as being the reference. Then if the flow rate characteristic curve is determined, for example, the maximum flow rate that can be measured within a predetermined range of an error tolerance according to the determined flow rate characteristic curve is specified as a full-scale flow rate. The flow rate characteristic function K (also contains the flow rate characteristic curve and the full-scale flow rate) can be different in case that the sample fluid differs, however, it can be used in common if the flow rate sensor section 2, the branch flow channels 1$a$, 1$b$, and a hardware of the mass flow meter such as the laminar element are substantially the same. More specifically, the flow rate characteristic function K can be specified as a function that is versatile to the mass flow meter having the same arrangement (the same type).

The instrumental error correction coefficient $\alpha$ is set for every mass flow controller A1 with the following procedures, for example, prior to shipping, and each instrumental error correction coefficient $\alpha$ is stored in the MFC side memory section 4$b$ of each mass flow controller A1 respectively.

Procedure 1: First, the setting section 4$c$ reads out the corresponding flow rate characteristic function K from the MFC side memory section 4$b$ by the use of an inert gas such as $N_2$ as the sample fluid to be measured and sets the flow rate characteristic function K.

Procedure 2: Next, $N_2$ is actually flown in the mass flow controller A1 by the use of the read out flow rate characteristic function K and a gas flow rate is measured at the full-scale point FP (mark ●) shown in FIG. 5.

Procedure 3: The above-mentioned procedures 1 and 2 are conducted on multiple (one of which is a mass flow controller to be the reference) mass flow controllers A1, and the instrumental error (the flow rate error) between each of the mass flow controllers A1 is obtained and an instrumental error correction parameter to compensate the instrumental error is set.

As mentioned, since the reference fluid such as the inert gas is adopted as the sample gas G and a correction is conducted only at one point as the full-scale point so as to specify the instrumental error correction parameter that can be applied to multiple kinds of the sample gas G whose physical property such as specific gravity, viscosity and specific heat approximates, it is possible to change the sample gas G to the other gas easily on the spot of actually manufacturing semiconductors.

Figure 6:
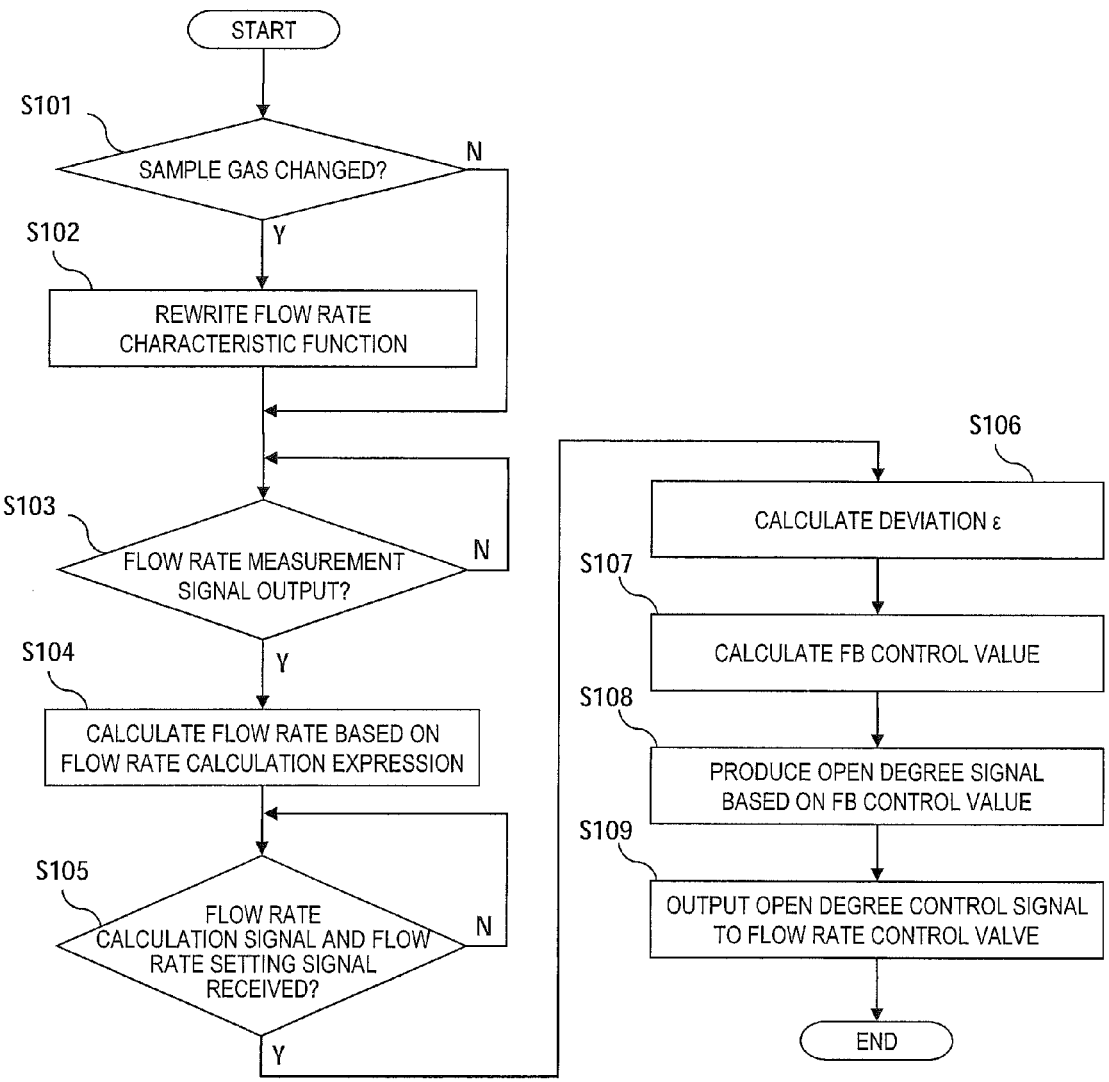
FIG. 6 is a flow chart showing an operation of the mass flow controller in this embodiment.

Next, an operation of the mass flow controller A1 having the above-mentioned arrangement will be explained with reference to the flow chart in FIG. 6 with a focus on the controlling section 4. As shown in FIG. 6, in case that the sample gas G is changed (step S101), the setting section 4$c$ receives that the sample gas G is changed and the flow rate calculating expression (P2) comprising the same as the flow rate characteristic function K corresponding to the sample gas G and the same as the instrumental error correction parameter $\alpha$ prior to change is set (step S102). More specifically, the setting section 4$c$ replaces the flow rate characteristic function alone by a new flow rate characteristic function K that is read out from the MFC side memory section 4$b$ and that corresponds to the changed sample gas G.

In case that the flow rate detected signal is output from the flow rate sensor section 2 (step S103), the flow rate calculating section 4$d$ calculates the flow rate of the sample gas G flowing in the gas flow channel 1 based on the flow rate calculating function (P2) (step S104). If there is no change in the sample gas G, it is possible for the flow rate calculating section 4$d$ to calculate the flow rate based on the flow rate calculating function set in advance. The calculated flow rate is output outside (displayed) as the flow rate measurement value.

Thus far the operation of the mass flow sensor is explained. Next will be explained as a case of the mass flow controller A1 and the mass flow controller system A containing the mass flow controller A1. In case that the deviation calculating section 4$a$1 of the controlling section 4$a$ receives a flow rate calculation signal showing the flow rate of the sample gas G calculated by the flow rate calculating section 4$d$ and the flow rate setting signal output from the command device A2 (step S105), the mass flow controller system A further calculates a difference between the flow rate measurement value as being the value of the received flow rate calculation signal and the flow rate setting value as being the value of the flow rate setting signal, namely the deviation $\epsilon$ (step S106).

Then the control value calculating section 4$a$2 calculates a feedback control value to the flow rate control valve 3 by providing the PID calculation on the deviation $\epsilon$ (step S107).

Next, the open degree control signal output section 4$e$ produces an open degree control signal based on the feedback control value (step S108), and outputs the open degree control signal to the flow rate control valve 3 and controls the flow rate by changing the open degree of the flow rate control valve 3 (step S109).

Accordingly, with the mass flow controller system A using the mass flow meter and the mass flow controller A1, since the instrumental error correction parameter α can be dealt independently from the flow rate characteristic function K (the gas characteristic curve determining coefficient and the full-scale coefficient), even though a setting of a kind of the gas as being an object to be controlled is changed, it is possible to control the flow rate easily with high accuracy by changing the flow rate characteristic function K without troubling an operator.

In addition, since the high order polynomial expression such as the quintic equation is used as the flow rate characteristic curve constituting the flow rate characteristic function, it is possible to enlarge a full-scale range with providing a preferable approximation, which enables to conduct the measurement of the flow rate with high accuracy by widening a range of the sensor output at the maximum side. As a result, it is possible to provide the superior mass flow controller A1 and the superior mass flow controller system A that can control the fluid with high accuracy.

Since the instrumental error correction parameter α is obtained by measuring the highly convenient inert gas such as nitrogen gas as being the reference gas at the full scale point FP, and can be applied also to other sample gas G generally, there is no need of conducting a correcting operation resulting from the change of the gas on the spot even though the setting of the sample gas (the process gas) is changed.

Since the database containing various kinds of the flow rate characteristic functions is arranged for a higher level computer such as the command device A2 than the mass flow controller A1, in case of conducting a change of setting the sample gas, it is possible to change the gas as being the object to be measured easily on the spot by transmitting the corresponding flow rate characteristic function and combining the flow rate characteristic function with the instrumental error correction parameter a that is high in general versatility to the sample gas. As a result, it is possible to make the general versatility of the mass flow controller to the sample fluid extremely high.

The present claimed invention is not limited to the above-mentioned embodiment. For example, in the above embodiment, the receiving section A22 as the sample fluid receiving section and the memory section A21 where the flow rate characteristic functions K are compiled as the database are arranged for the command device A2, however, they may be arranged for the mass flow controller A1 so that the mass flow controller A1 may be used stand-alone.

The flow rate characteristic curve is the quintic equation, however, the function that determines the flow rate characteristic may be quartic and below or sextic and above, and is not limited to a polynomial expression.

In addition, the reference gas as being the reference fluid is not limited to the nitrogen gas. For example, other inert gas may be used as the reference gas. As the fluid, a liquid also can be conceived.

Furthermore, a concrete arrangement of each component is not limited to the above-mentioned embodiment, and may be variously modified without departing from the spirit of the invention.

EXPLANATION OF CODE

1 . . . gas flow channel (flow channel)
2 . . . flow rate sensor section (sensor section)
3 . . . flow rate control valve (control valve)
4a . . . controlling section
4c . . . setting section
4d . . . flow rate calculating section
A . . . mass flow controller system
A1 . . . mass flow controller
A21 . . . memory section
A22 . . . receiving section (sample fluid receiving section)
G . . . sample gas (sample fluid)
K . . . flow rate characteristic function
α . . . instrumental error correction parameter

The invention claimed is:

1. A mass flow meter comprising
a sensor section that detects a flow rate of a sample fluid flowing in a flow channel,
a setting section that sets
a flow rate characteristic function whose input variable is an output value of the sensor section, wherein the flow rate characteristic function is intrinsic to the sample fluid, and
an instrumental error correction parameter that is independent from the flow rate characteristic function, wherein the instrumental error correction parameter is common to multiple sample fluids,
a flow rate calculating section that calculates a flow rate measurement value of the sample fluid by multiplying a value that is calculated by entering the output value of the sensor section as an input into the flow rate characteristic function by the instrumental error correction parameter; and
a memory section;
wherein the instrumental error correction parameter is set and stored in the memory section at a time of manufacturing the mass flow meter.

2. The mass flow meter of claim 1, wherein
the flow rate characteristic function is expressed by a quintic equation.

3. The mass flow meter of claim 1, wherein
the instrumental error correction parameter is a coefficient designed to eliminate an error between (a) a full-scale flow rate calculated by setting the flow rate characteristic function intrinsic to the reference fluid, and (b) the flow rate measurement value at a time when the full scale flow rate is measured by the mass flow meter to be a reference.

4. The mass flow meter of claim 1, wherein
the instrumental error correction parameter is a coefficient that is obtained by actually measuring nitrogen gas as a reference fluid and the coefficient is common to other different multiple sample gases.

5. A mass flow controller comprising
a mass flow meter comprising
a sensor section that detects a flow rate of a sample fluid flowing in a flow channel;
a setting section that sets
a flow rate characteristic function whose input variable is an output value of the sensor section, wherein the flow rate characteristic function is intrinsic to the sample fluid, and
an instrumental error correction parameter that is independent from the flow rate characteristic function, wherein the instrumental error correction is common to multiple sample fluids; and
a flow rate calculating section that calculates a flow rate measurement value of the sample fluid by multiplying a value that is calculated by entering the output value of the sensor section as an input into the flow rate characteristic function by the instrumental error correction parameter;

a control valve arranged in the flow channel, a controlling section that performs a comparison operation on the flow rate measurement value and a flow rate setting value and that controls the control valve based on a result of the comparison operation;

a memory section;

wherein the instrumental error correction parameter is set and stored in the memory section at a time of manufacturing the mass flow meter.

6. A mass flow meter system comprising, a mass flow meter comprising a sensor section that detects a flow rate of a sample fluid flowing in a flow channel;

a setting section that sets a flow rate characteristic function whose input variable is an output value of the sensor section, wherein the flow rate characteristic function is intrinsic to the sample fluid, and an instrumental error correction parameter that is independent from the flow rate characteristic function, wherein the instrumental error correction is common to multiple sample fluids;

a flow rate calculating section that calculates a flow rate measurement value of the sample fluid by multiplying a value that is calculated by entering the output value of the sensor section as an input into the flow rate characteristic function by the instrumental error correction parameter; and a command device that is to communicate with the mass flow meter and that has a memory section to store the flow rate characteristic function related to each sample fluid and a sample fluid receiving section to receive designation of the sample fluid flowing in the flow channel, wherein the setting section searches the memory section for the flow rate characteristic function intrinsic to the sample fluid designated by the receiving section and sets the flow rate characteristic function; and wherein the instrumental error correction parameter is set and stored in the memory section at a time of manufacturing the mass flow meter.

7. A mass flow controller system comprising a mass flow controller comprising a mass flow meter comprising a sensor section that detects a flow rate of a sample fluid flowing in a flow channel;

a setting section that sets a flow rate characteristic function whose input variable is an output value of the sensor section, wherein the flow rate characteristic function is intrinsic to the sample fluid, and an instrumental error correction parameter that is independent from the flow rate characteristic function, wherein the instrumental error correction is common to multiple sample fluids;

a flow rate calculating section that calculates a flow rate measurement value of the sample fluid by multiplying a value the flow rate characteristic function and the instrumental error correction parameter to the flow rate detected value;

a control valve arranged in the flow channel;

a controlling section that performs a comparison operation on the flow rate measurement value and a flow rate setting value and that controls the control valve based on a result of the comparison operation; and a command device that is to communicate with the mass flow controller and that has a memory section to store the flow rate characteristic function related to each sample fluid and a sample fluid receiving section to receive designation of the sample fluid flowing in the flow channel, wherein the setting section searches the memory section for the flow rate characteristic function intrinsic to the sample fluid designated by the receiving section and sets the flow rate characteristic function wherein the instrumental error correction parameter is set and stored in the memory section at a time of manufacturing the mass flow meter.

\* \* \* \* \*